United States Patent [19]

Takahashi et al.

[11] Patent Number: 4,984,512
[45] Date of Patent: Jan. 15, 1991

[54] AUTOMATIC BREAD-MAKING DEVICE

[75] Inventors: Yoshinori Takahashi, Nari; Jun Misaki, Shijonawate; Takayuki Karaki, Nara, all of Japan

[73] Assignee: Zojirushi Corporation, Osaka, Japan

[21] Appl. No.: 419,794

[22] Filed: Oct. 11, 1989

[51] Int. Cl.⁵ .............................................. A47J 27/00
[52] U.S. Cl. ........................................ 99/327; 99/332; 99/348; 99/468; 364/143; 364/146; 364/557; 366/98; 366/146; 366/601
[58] Field of Search ................. 99/328, 327, 329 R, 99/331, 348, 332, 467, 468, 352, 353, 483, 484, 486; 366/69, 98, 144–146, 96, 97, 601; 426/504, 512; 364/143, 146, 154, 192, 184, 400, 557

[56] References Cited

U.S. PATENT DOCUMENTS

| | | | |
|---|---|---|---|
| 4,538,509 | 9/1985 | Ojima et al. | 99/352 |
| 4,636,949 | 1/1987 | Longabaugh | 99/327 |
| 4,762,057 | 8/1988 | Hirota et al. | 99/348 |
| 4,776,265 | 10/1988 | Ojima | 99/348 |
| 4,790,665 | 12/1988 | Hayashi | 366/98 |
| 4,802,407 | 2/1989 | Negri et al. | 366/146 |
| 4,836,683 | 6/1989 | Aoyama | 366/601 |

*Primary Examiner*—Timothy F. Simone
*Attorney, Agent, or Firm*—Jones, Tullar & Cooper

[57] ABSTRACT

An automatic bread-making device comprises a housing, a cooking vessel, a kneading apparatus for kneading ingredients for bread in the vessel, a heating apparatus for heating the cooking vessel, and a control system for controlling the kneading apparatus and heating apparatus in sequence. The control system comprises a control memory for storing a sequence of standard operations for a bread-making process, a time-setting apparatus for manually setting a time at which a step to be executed in the bread-making process is proceeded to the next step, a storage apparatus for storing a sequence of operations set by the time-setting apparatus, and a control apparatus responsive to the program stored in the control memory apparatus or the program stored in the storage apparatus.

1 Claim, 6 Drawing Sheets

AUTOMATIC BREAD-MAKING DEVICE

BACKGROUND OF THE INVENTION

The present invention relates to an automatic bread-making device and, more particularly, an automatic bread-making device capable of automatically carrying out a programmed sequence of steps in a bread-making process which comprises the steps of mixing all the ingredients of bread to form dough, leavening the resulting dough, kneading the dough to remove produced gases, leavening it for shaping, baking the shaped dough, and then cooling the resulting bread.

In recent years, such automatic bread-making devices have been proposed in various Japanese patent applications. For example, Japanese patent laid open No. 60-16534 discloses an automatic bread-making device comprising a housing, a cooking vessel removably arranged therein, a mixing means for kneading all the ingredients of bread in the cooking vessel, a heating means for baking a dough in the vessel, and a sequence control system for controlling the mixing means and heating means to automatically carry out entire steps in the bread-making process in sequence.

Such a device performs a series of steps in the bread-making process by turning a power switch on after placing all the ingredients, such as wheat flour, a leavening agent or yeast, salt and water in the cooking vessel. The ingredients are kneaded by the mixing means to prepare a dough, and the resulting dough is leavened, kneaded to remove produced gas in the dough, leavened to form it into a shape, baked, and then cooled to complete the bread. All these bread-making steps are automatically carried out by means of the control system as it controls the mixing means and heating means in the programmed sequence. Thus, the task for the operator is to place the ingredients in the vessel, making it easy to produce bread at home.

However, the bread-making device of the prior art is controlled by the sequence of control commands issued by the control system, i.e., a fixed program stored in a read only memory of the control system, thus making it impossible for the operator to modify or change the programmed sequence of operations. Since the quality and kind of ingredients such as wheat flour are of prime importance to the finished bread, the optimum sequence program varies with the ingredients used. If any one of the ingredients, for example, wheat flour is replaced for the one recommended by the maker of the bread-making device, it is impossible to produce bread with color, texture and hardness which the user finds agreeable.

SUMMARY OF THE INVENTION

It is therefore an object of the present invention to provide an automatic bread-making device which makes it possible to produce home-baked bread with color, texture and hardness as desired.

Another object of the present invention is to provide an automatic bread-making device with a sequence control system which makes it possible to modify a sequence of operations for the bread-making process according to the operator's demand.

According to the present invention, there is provided an automatic bread-making device with a sequence control system for automatically carrying out programmed sequence of baking operations, said control system comprising manual setting means for performing determination of the time required since each operation is started and for proceeding the program to the next step, a memory means for storing basic programmed sequence of operations in the bread-making process, a data storage means for storing a sequence of operations set by the manual setting means, and a control means responsive to the program stored in the program memory means or in the data storage means.

An automatic bread-making device according to the present invention comprises a housing, a cooking vessel, a kneading means for kneading ingredients for bread in the vessel, a heating means for heating the cooking vessel, and a control system for controlling the kneading means and heating means in sequence, the control system comprising a control memory means (usually, ROM) for storing sequence of standard operations for bread-making process, a time-setting means for manually setting a time at which a step to be executed in the bread-making process is proceeded to the next one, a storage means (usually, RAM) for storing a sequence of operations set by the time-setting means, and a control means (usually, CPU) responsive to the program stored in the control memory means or the program stored in the storage means.

The bread-making device according to the present invention is controlled by the sequence control system to automatically carry out a programmed sequence of operations for the bread-making process, thus making it easy to make bread at home. The baking program may be modified, as desired, by operating the time-setting means during operation of the device being controlled by a programmed sequence of standard operations. The sequence of operations modified by the time-setting means may be stored in the storage means for future use.

These and other objects and features of the present invention will be apparent from the following detailed description with reference to the accompanying drawings which show, by way of example only, preferred embodiments thereof.

DETAILED DESCRIPTION OF THE PREFERRED EMBODIMENTS OF THE PRESENT INVENTION

Figure 1:
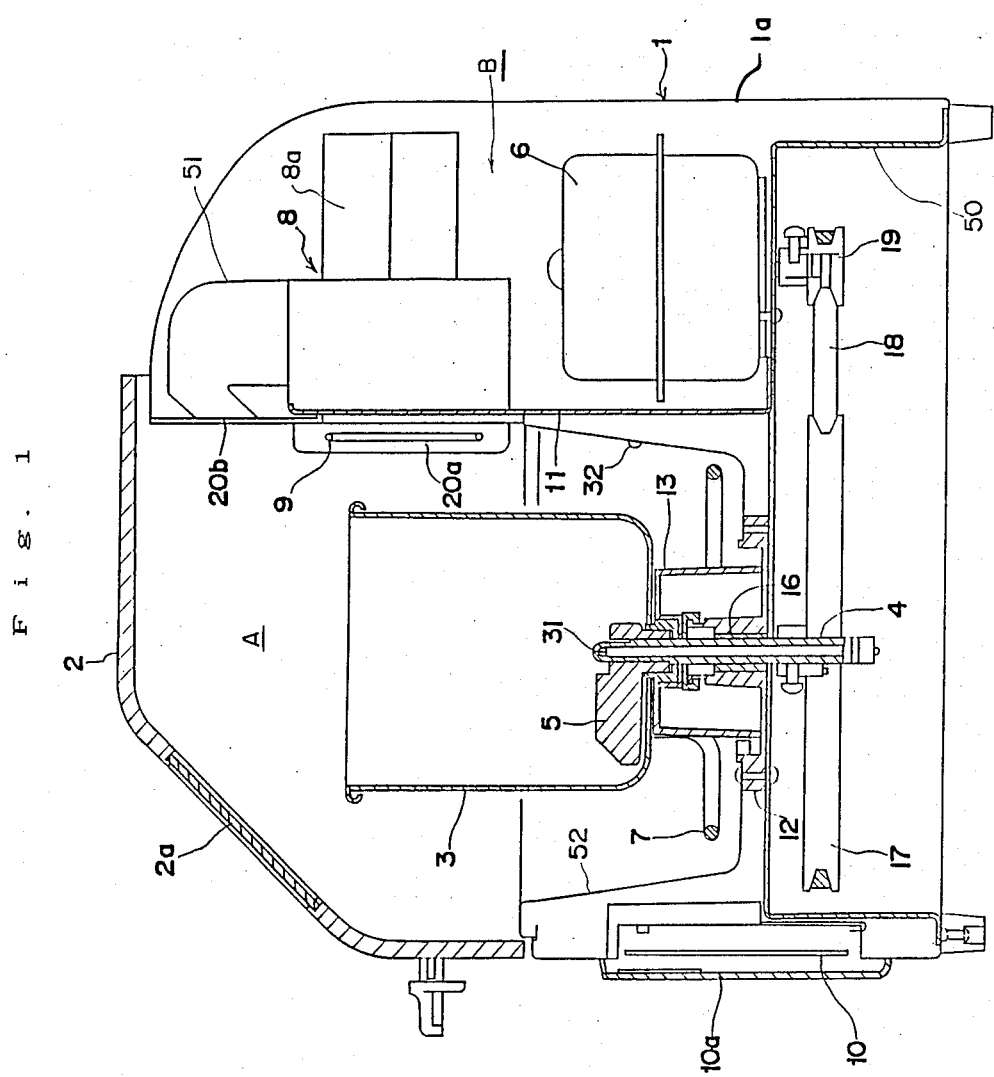
FIG. 1 is a schematic diagram of an automatic bread-making device embodying the present invention.

Referring now to FIG. 1, there is shown an automatic bread-making device of the present invention. The device comprises a housing 1, a cooking vessel 3, a kneading means for kneading ingredients for bread in the vessel, a heating means 7 for heating the cooking vessel 3, and a control system 10 for controlling operation of the device.

The housing 1 is made up of two parts, a housing body 1a and a lid 2 pivotally mounted thereon. An interior of the housing 1 is divided into two chambers, a cooking chamber, A, and a motor chamber, B, by an internal wall member 11 fixed on an inner bottom member 50 of the housing body 1a. The lid 2 is provided with a window 2a to allow the operator to peep into the interior of the housing. The cooking vessel 3 is arranged in the cooking chamber A and removably mounted on a supporting member 13, which is mounted on the bottom member 50 by the base member 12.

The kneading means comprises a driving shaft 4, a kneading blade 5 removably mounted thereon, an electric motor 6 arranged in the chamber B, and a driving mechanism comprising pulleys 17, 19 and a driving belt 18. The driving shaft 4 is rotatably mounted in a sleeve 16 mounted in the base member 12 so that it extends through the supporting member 13 and the the cooking vessel 3 and terminates in the interior of the vessel 3. The driving shaft 4 is provided at its lower end with a pulley 17 and driven by the motor 6 via the driving belt 18 and the pulley 19.

To control the temperature of the cooking chamber A, an electric fan 8 is additionally provided on the partition wall 11. The air in the interior of the chamber A is sucked in a duct 51 through a suction port 20a by the electric fan 8 and then blown into the chamber A through a blow port 20b. An auxiliary heating element or a fan heater 9 is arranged in the suction port 20a to heat the circulating air as occasion demands.

Figure 3:
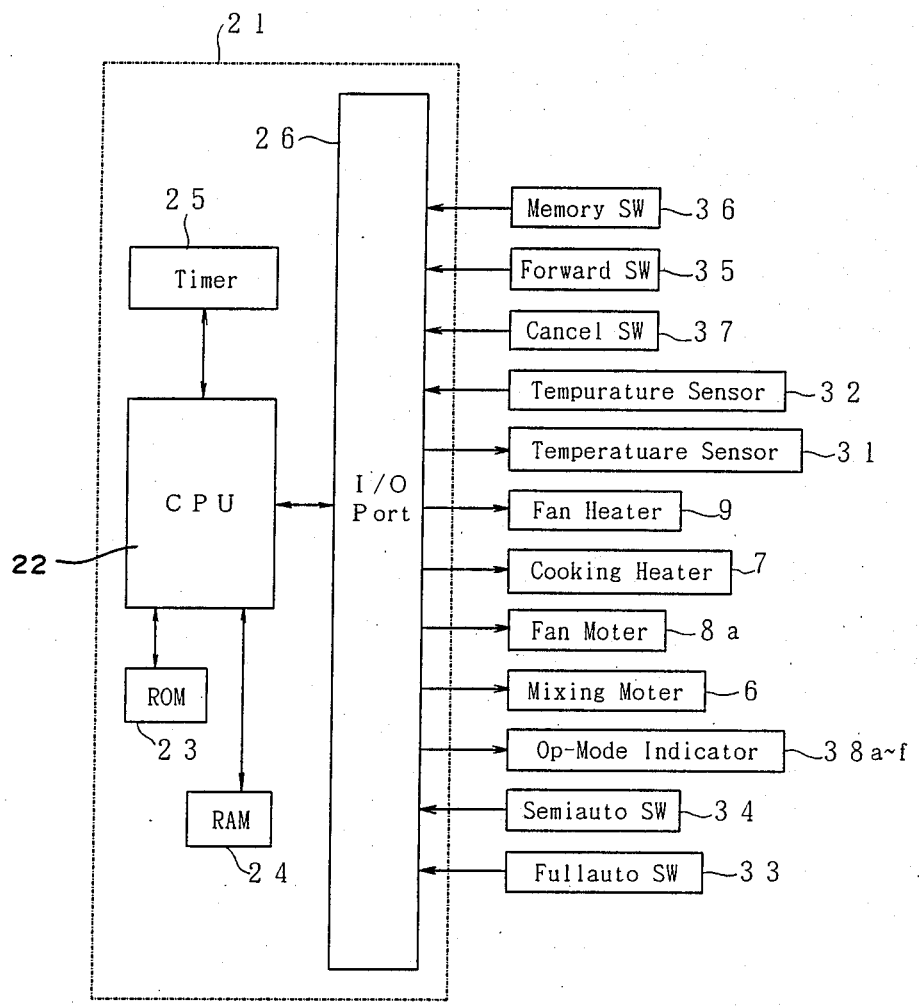
FIG. 3 is a block diagram of a control system used in the automatic bread-making device of FIG. 1.

The control system 10 is arranged in a front part of the housing 1 and is covered with an instruction and control panel 10a. As shown in FIG. 3, this control system 10 comprises a microcomputer 21 including a central processing unit (hereinafter referred to as CPU) 22, a read only memory (ROM) 23, a random access memory (RAM) 24, a timer 25 and an input-output port (I/O port) 26. The microcomputer control program and data are stored in the ROM.

The control system 10 also includes temperature sensors 31, 32, a group of switches including operation mode select switches 33, 34, 35 and 36, and a cancel switch 37, a group of operation mode indicating elements 38a to 38f such as light emitting diodes (LED), all of which are connected to the microcomputer 21 as shown in FIG. 3. The temperature sensor 31 is arranged in the top of the driving shaft 4 to detect a temperature of a bread material, while the temperature sensor 32 is mounted on an inner bottom member 52 to detect a temperature of the cooking chamber A.

Figure 2:
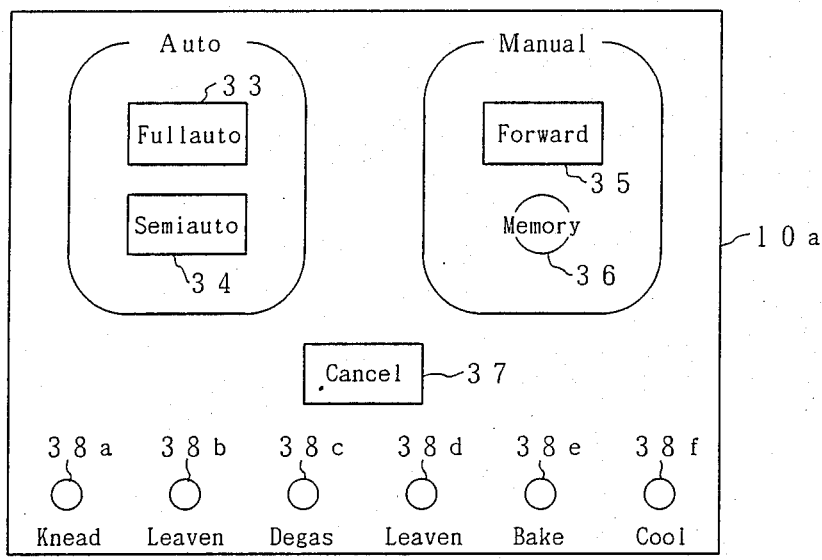
FIG. 2 is a front view showing a control panel of the device of FIG. 1.

As shown in FIG. 2, the operation mode indicators 38a–38f are arranged on the indication and control panel 10a to indicate the operating conditions of the device. Also, the switches 33–37 are arranged on the control panel 10a. The switch 33, which may be called as a fully automated mode select switch, is used to select a full automatic operation mode. The switch 34, a semi-automated mode select switch, is used for selection of a semiautomatic operation mode. The switch 35 is used for selection of a manual operation mode and serves as a forward switch which provides a signal to the microcomputer 21 to forward the step in the bread-making process to the next step as well as to store informations from the timer 25 in the RAM 24. The switch 36 is used for selection of a repeated operation mode and serves as a memory switch producing a signal for storing data in the RAM for future operation. The switch 37 is used for canceling the data stored in the RAM.

The mixing motor 6, the fan motor 8a, the baking heater 7 and the auxiliary heater 9 are controlled by a program stored in the ROM 23 or the RAM of the control system 10 to automatically carry out a series of steps in the bread-making process comprising the steps of mixing all the ingredients to form a dough, leavening the resulting dough, kneading the dough, leavening it for shaping, baking the shaped dough, and cooling the resulting bread.

Figure 4:
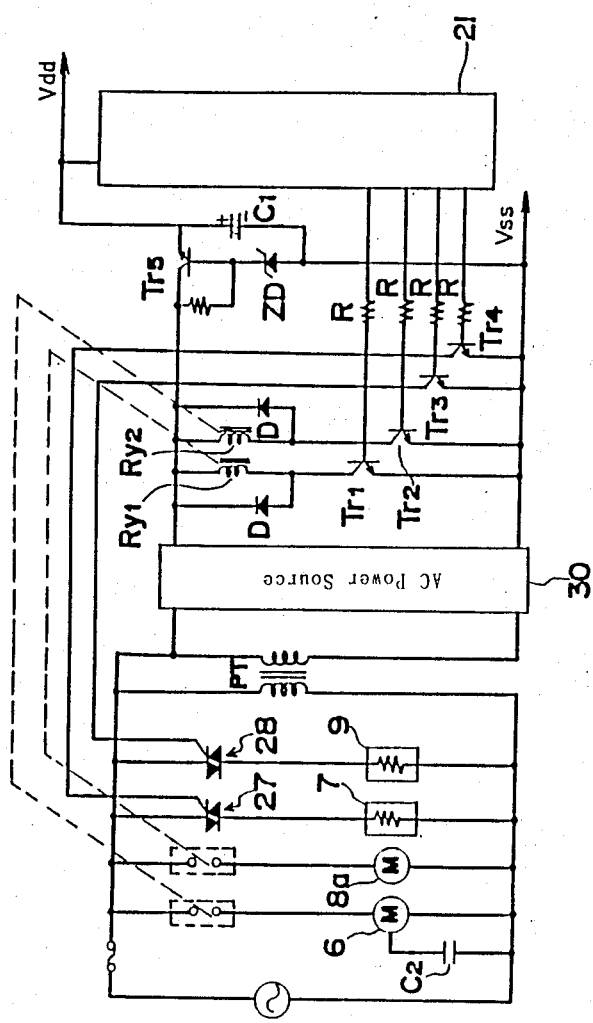
FIG. 4 is a diagram showing an electric circuit of the control system for the device of FIG. 1.

As shown in FIG. 4, the mixing motor 6 and the fan motor 8a are electrically connected to a power source through a set of normally opened contacts of respective relays $Ry_1$ and $Ry_2$. Each relay coil is connected to a direct current power source 30 through a driver transistor $Tr_1$ or $Tr_2$. It is turned on by a signal from the microcomputer 21 through its I/O ports to close the contacts of the relay $Ry_1$ or $Ry_2$. A diode D is connected to each relay coil in parallel to protect the transistor from the reversed electromotive force of the relay coil. The baking heater 7 and auxiliary heater 9 are respectively connected in series with a triac 27 or 28. The triacs 27 and 28 are respectively triggered by signals from a transistor $Tr_3$ or $Tr_4$ connected to the I/O port of the microcomputer 21 through a resistor R. Each transistor $Tr_1$, $Tr_2$, $Tr_3$, or $Tr_4$ is initially biased off, but turns on when it receives a signal or signals from the microcomputer 21. The control system shown in FIG. 4 further includes a power transformer PT and a voltage stabilizing circuit comprising a transistor $Tr_5$, a zener diode ZD and a capacitor C.

If the full automated mode select switch 33 is pushed on, the bread-making device will enter into the fully automated operation mode and is controlled by a program stored in the ROM of the microcomputer 21.

In the semiautomated mode operation, the device is controlled automatically during first several steps in the bread-making process, i.e., from the first mixing step to the shaping step, while the remaining steps must be controlled by the person operating the device. In this case, the person must monitor the dough to be baked and then push the forward switch 35 when the bread is baked as desired, to transfer the operation of the device from the baking step to the next cooling step.

In the manually operated mode, the bread-making device is basically controlled by a program stored in the ROM, but this program may be modified according to the demand of the person operating the bread-making device. In this case, the program is forcedly proceeded by pushing the forward switch 35 during the predetermined period of time for each operation. Once the device has been operated by the manual mode, the resulting information and data may be stored in the RAM. These information and data can be used for the repeated operation mode of the device and can be canceled by pushing the cancel switch 37.

The control operation of the thus constructed bread-making device will be explained with reference to FIGS. 5 to 7 of the accompanying drawings.

Figure 5:
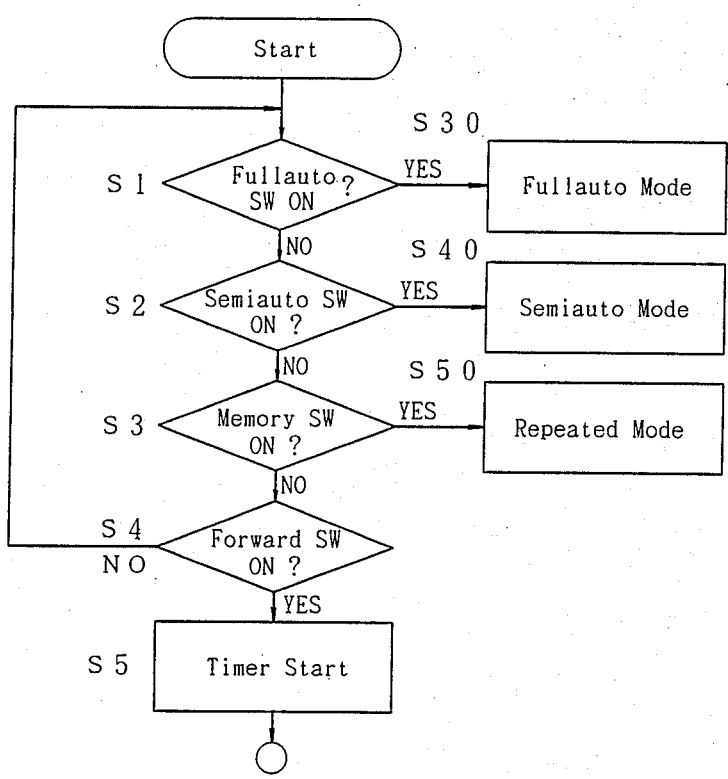
FIGS. 5 to 7 are flow diagrams showing a sequence of operations of a microcomputer used in the control system of FIG. 3.
Figure 6:
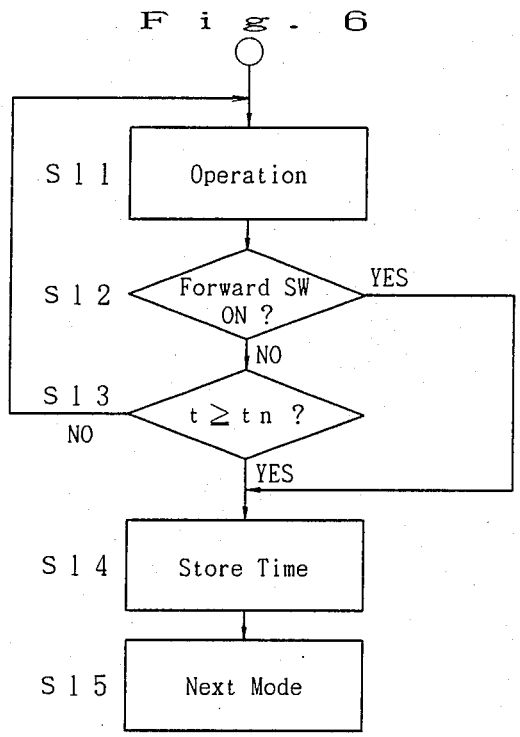

Reference is firstly made to FIG. 5. Turning on the power, a decision is firstly made at step 1 as to whether or not the fully automated operation mode select switch 33 (hereinafter referred to as an "auto switch") is pushed on. If the auto switch 33 is pushed on, the program jumps to step 30 to enter the fully automated operation mode. If the auto switch 33 is not pushed on, the program proceeds to step 2, where a similar decision is made as to whether or not the semiautomated operation mode select switch 34 (hereinafter referred to as a "semiauto switch") is pushed on. If the semiauto switch 34 is pushed on, the program jumps to step 40 to enter the semiautomated operation mode. If the semiauto switch 34 is not pushed on, the program proceeds to step 3, where a decision is made as to whether or not the repeated operation mode select switch 36 (hereinafter referred to as a "memory switch") is pushed on. If the memory switch 36 is pushed on, the program proceeds to step 50 immediately to enter the repeated operation mode, and the device is controlled by a program, which has been stored in the RAM after operating the bread-making device in the manual operation mode. If the memory switch 36 is not pushed on, the program proceeds to step 4.

At step 4, a decision is made as to whether or not the manual operation mode select switch 35 (hereinafter referred to as a "forward switch") is pushed. If the forward switch 35 is not pushed at this step, the program returns to step 1. Thus, the decision will be made repeatedly until any one of the mode select switches 33–36 is pushed.

If the forward switch 35 is pushed, the program proceeds to step 5, where the timer 25 begins to count a time to determine a period of time required for the first kneading step. Then, the kneading operation is started at step 11 and continued until the forward switch 35 is pushed on the next time, as shown in FIG. 6.

After starting of the kneading operation, a decision is made at step 12 as to whether or not the forward switch 35 is pushed on. If the forward switch 35 is not pushed on, the program proceeds to step 13, where a decision is made as to whether or not the time measured by the timer 25 is equal to or greater than the predetermined time tn, for example, 30 minutes. If a decision that the measured time t is not equal to or greater than the predetermined time tn has been made at step 13, the program returns to step 11 and then repeats the decision at step 12.

During the kneading step, if a decision that the forward switch 35 is pushed on is made at step 12, or if the measured time t exceeds the predetermined time tn before the forward switch 35 being pushed at step 12, the program proceeds to step 14, at which the time intervals measured by the timer 25 is stored in the RAM 24, and then the program proceeds to step 15 to carry out the first leavening step in the bread-making process.

In like manner, these steps 11 to 15 are applied to the subsequent steps in the bread-making process, i.e., the first leavening step, the second kneading step, the second leavening step, the third kneading step, the third leavening step for shaping, the baking step and the cooling step. The transfer from each operation to the next operation is performed by pushing the forward switch 35 on at suitable intervals. The maximum time tn for each step in the bread-making process may be determined, for example, as follows:

| First kneading: | 30 minutes |
|---|---|
| First leavening: | 120 minutes |
| Second kneading: | 30 minutes |
| Second leavening: | 120 minutes |
| Third leavening: | 120 minutes |
| Baking: | 60 minutes |
| Cooling: | 60 minutes |

Figure 7:
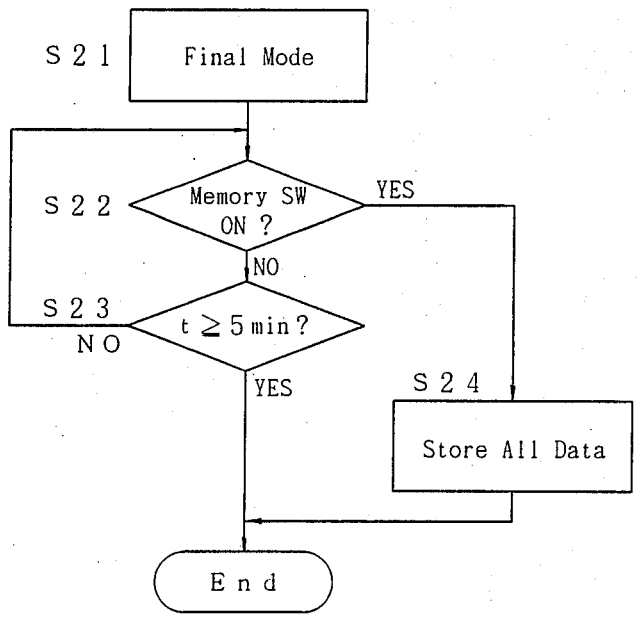

After completing the cooling operation, the forward switch 35 is pushed to enter the final mode shown in FIG. 7. When receiving this signal from the forward switch 35, the microcomputer 21 can set off a buzzer at step 21, and then performs a decision at step 22 as to whether or not the memory switch 36 is pushed on. If the memory switch 36 is pushed on, the program proceeds to step 24, where the above sequence of operations are restored in the RAM for the next operation, and all the operation is stopped. If the memory switch is not pushed on, the program proceeds to step 23. At this step, a decision is made as to whether or not the time t measured by the timer 25 is equal to or exceeds the predetermined time, for example, 5 minutes. If the time t is shorter than the predetermined time, the program repeats steps 22 and 23. If the time t reaches to or exceeds the predetermined time before the memory switch 36 is pushed on, the above sequence of operations are deleted when the power switch is opened.

In use, home-baked bread is made in the following manner: Firstly, a suitable amount of yeast is put into the cooking vessel 3, and then other solid or powder ingredients such as wheat flour, sugar and the like are put into the vessel 3 so as to cover the yeast. After this, a required amount of liquid, usually water is poured into the vessel so that the yeast and water are separated from one another by the powder ingredients positioned between them. Because, if the yeast comes into contact with cold water, its function is considerably decreased, resulting in failure to perform sufficient leavening of a dough.

Under such a condition, one of the operation mode select switches 33 to 36 is pushed on to start the bread-making steps. When reproducing the same sequence of operations as before, the memory switch 36 is pushed on. When making bread with a new sequence of operations, the forward switch 35 is pushed on. Here, supposing that the forward switch 35 is pushed on, the device is basically controlled by a program which is stored in the ROM of the microcomputer 21, but this program can be modified by operating the forward switch 35.

If the temperature of the ingredients is lower than the predetermined temperature, for example, 25° C., it is preferred to heat the ingredients by the cooking heater 7 before mixing, to avoid extinction of yeast. This may be performed, for example, in the following manner. Firstly, the temperature of the ingredients in the vessel 3 is detected by the temperature sensor 31 and compared with the above predetermined temperature. If the detected temperature is lower than the predetermined value, the ingredients are heated to the predetermined temperature by the cooking heater 7. In this case, the cooking heater 7 may be controlled, for example, in the following manner. A temperature of the cooking chamber A is detected by the temperature sensor 32 and compared with a predetermined temperature, for example, 40° C. If the detected temperature is lower than the predetermine temperature, the driver transistor $Tr_4$ is turned on and off by pulses from the microcomputer 21 to trigger the triac 27, thereby applying an AC voltage to the cooking heater 7. The cooking chamber A is heated to and maintained at the predetermined temperature by on-off control of the cooking heater 7. This heating operation is stopped by a signal from the temperature detector 31 when the temperature of the ingredients has reached to the predetermined temperature, i.e., 25° C.

After this, or after receiving the signal provided from the forward switch 35 when the temperature of the ingredients has reached the above predetermined value, the microcomputer 21 turns on the driving circuit for the LED 38a which indicates that the device is in the kneading step. At the same time, it turns on the driver transistor $Tr_2$ to energize the relay $Ry_2$. The contacts of the relay RY$_2$ closes and drives the mixing motor 6. Thus, the kneading blade 5 is driven by the motor 6 via the pulley 19, the drive belt 18, pulley 17 and the drive shaft 4, and the ingredients in the vessel 3 are mixed and kneaded to prepare a dough.

When the temperature surrounding the housing 1 are low as in a winter season, the temperature of the ingredients will be reduced during kneading. In such a case, it is preferred to maintain the ingredients at a temperature of more than 25° C. by supplementally heating the air with the heater 9. In this case, the microcomputer 21, which has received a signal from the temperature sensor 32, turns on the driver transistor Tr$_1$ after a suitable time, for example, 1 minute, has elapsed since the kneading is started. This time is counted by the counter timer. The transistor Tr$_1$ energizes the relay Ry$_1$, and the contacts of the relay closes and applies an AC voltage to the fan motor 8a. At the same time, the driver transistor Tr$_3$ is turned on by pulses from the microcomputer 21, and the triac 28 is triggered and applies an AC voltage to the heater 9 to heat the air in the cooking chamber A. The heated air is blown to the dough through the blow port 20b during kneading.

When visually judging that the ingredients have been kneaded sufficiently, the forward switch 35 is pushed on by the operator to proceed the program to the next bread-making step, i.e., the first leavening. At the beginning of this step, the driver transistor Tr$_2$ is turned off by the signal from the microcomputer 21 to de-energize the relay Ry$_2$, and the mixing motor 6 is stopped. At the same time, the time required since the first kneading is started is stored in the RAM. This time is measured by the timer 25. The second LED 38b is then turned on by its driving circuit, which has received a signal from the microcomputer 21, to indicate that the device is in the first leavening step. During this first leavening, the temperature in the cooking chamber A is maintained by the cooking heater 7 to a predetermined temperature, if necessary.

When leavening has proceeded as much as expected, the forward switch 35 is pushed on to enter into the second kneading step for removal of gas. At the beginning of this step, the time required since the leavening is started is also stored in the RAM. Then, the microcomputer 21 turns on the driver transistor Tr$_2$ to drive the mixing motor 6 again.

In like manner, the forward switch 35 is pushed on repeatedly to proceed the program to the next step when making a decision that each operation has been performed sufficiently. At the same time, the indicators 38c to 38f are respectively turned on in order. Also, the time required since each operation is started is stored in the RAM.

After the second leavening, third kneading and the third leavening for shaping have been carried out in the same manner as above, the forward switch 35 is pushed on to enter into the baking step. The microcomputer 21, which has received a signal from the forward switch 35, turns on the transistor Tr$_4$ to trigger the triac 27. It applies an AC voltage to drive the cooking heater 7. Thus, the baking operation is carried out.

When judging that the bread has been baked sufficiently, the forward switch 35 is pushed on to proceed the program to the next step, i.e., the cooling step. Receiving the signal from the forward switch 35, the microcomputer 21 turns off the driver transistor Tr$_4$, which in turn turns off the triac 27. Thus, the power supply to the heater 7 is stopped. Then, the transistor Tr$_1$ is turned on by a signal from the microcomputer 21 to energize the relay Ry$_1$, and the fan 8 is driven by the fan motor 8a to cool the resulting bread with the air.

After judging that the bread is cooled sufficiently, the forward switch 35 is pushed on to complete all the operations in the bread-making process. Then the memory switch 36 is pushed on to store all the data in the RAM. If the storing of the above process is unnecessary, no switching operation is required.

Figure 8:
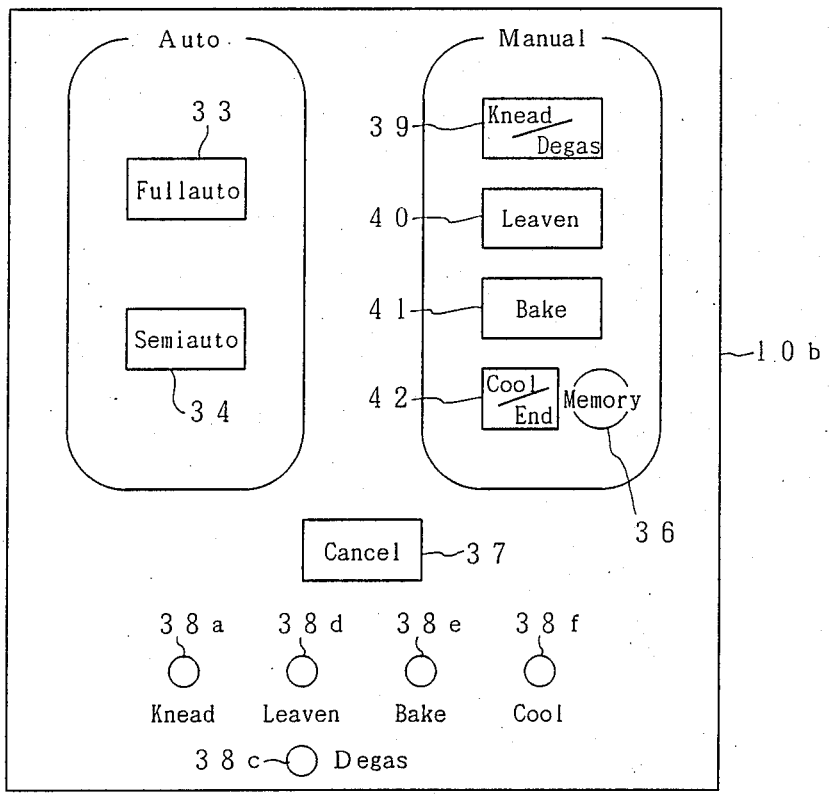
FIG. 8 is a front view of a control panel showing another preferred embodiment of the present invention.

Referring now to FIG. 8, there is shown a control panel used in another embodiment of the present invention. In this embodiment, four switches 39, 40, 41 and 42 are replaced for the forward switch 35. The other constructions of the device and the operations thereof are the same as those of the embodiment of FIG. 2. In these figures, like parts are designated by like reference numerals.

In this embodiment, each step in the bread-making process is proceeded by pushing on the switches 39, 40, 41 and 42 in order as indicated on the instruction and control panel 10b. The thus performed sequence of operations may be stored in the RAM as the user's own program for bread-making process. The kneading and leavening are carried out repeatedly by operating the switches 39 and 40 one after another several times. This makes it possible to prepare a sufficiently kneaded dough.

Modifications and variations of the present invention are possible in light of the above teachings. It is, therefore, to be understood that within the scope of the appended claims the invention may be practiced otherwise than as specifically described.

What is claimed is:

1. An automatic bread-making device comprising a housing having a cooking chamber, a cooking vessel removably arranged in said cooking chamber for containing all the ingredients of bread, kneading means arranged in said cooking vessel for kneading said ingredients of bread into a dough, heating means arranged in said cooking chamber to bake the dough in said cooking vessel, means for cooling the bread, and a control system for controlling said kneading means and said heating means to automatically carry out, in sequence, a series of steps in the bread-making process including a first kneading step in which all the ingredients are kneaded into a dough, a first leavening step for leavening the dough, a second kneading step for degassing the dough, a second leavening step for leavening the dough, a third kneading step for degassing the dough, a third leavening step for shaping the dough, a baking step for baking the dough, and a cooling step for cooling the produced bread, said control system comprising:

program memory means for storing a basic program for carrying out, in sequence, all the steps of said bread-making process;

manually operated switch means for selecting a manual operation mode and for forwarding the operating step of said bread-making process from one of said steps to the subsequent step;

a timer adapted to be started to count a time every time said switch means is operated so as to determine the period of time required for performance of each step of said bread-making process;

data storage means for storing data on the period of time determined by said timer to modify said basic program for future operation; and controlling means responsive to the program stored in said program memory means or in said data storage means.

* * * * *